(12) United States Patent
Wong (10) Patent No.: US 7,712,655 B2
(45) Date of Patent: May 11, 2010

(54) BANKING COMPUTER ACCOUNT SYSTEM WITH LOCK FOR SECURE PAYMENT VIA TELEPHONE

(76) Inventor: Kamfu Wong, 3 Keng Hau Road, Shatin, N.T., Hong Kong (CN)

( * ) Notice: Subject to any disclaimer, the term of this patent is extended or adjusted under 35 U.S.C. 154(b) by 1018 days.

(21) Appl. No.: 11/396,059

(22) Filed: Mar. 30, 2006

(65) Prior Publication Data

US 2006/0261152 A1 Nov. 23, 2006

Related U.S. Application Data

(63) Continuation-in-part of application No. PCT/CN2004/000080, filed on Jan. 20, 2004.

(51) Int. Cl.
*G06Q 40/00* (2006.01)
*G07D 11/00* (2006.01)
*G07F 19/00* (2006.01)
(52) U.S. Cl. .......................... 235/379; 235/382; 705/71; 705/74; 705/75
(58) Field of Classification Search ................ 235/379, 235/380, 382, 487; 705/70–79
See application file for complete search history.

(56) References Cited

U.S. PATENT DOCUMENTS

2003/0149662 A1* 8/2003 Shore .......................... 705/39
2006/0020540 A1* 1/2006 Cramer ........................ 705/39
2007/0288371 A1* 12/2007 Johnson ....................... 705/41

OTHER PUBLICATIONS

International Search Report; PCT/CN2004/000080; Oct. 14, 2004.

\* cited by examiner

*Primary Examiner*—Edwyn Labaze
(74) *Attorney, Agent, or Firm*—Beyer Law Group LLP

(57) ABSTRACT

A banking computer system with lock for secure payment via telephone and corresponding method, the system includes a telephone (1), a public communication system (2), a financial computer account system (3), wherein the financial computer account system (3) usually locks its user account (3-7), assigns a private phone number (6) to a user, and sets unlock information (8) associated with the user account (3-7) in the system. Once the user is connected to the financial computer account system (3) using the telephone (1) with the private phone number (6) through the public communication system (2), the financial computer account system (3) will check the unlock information (8) according to a predefined program, if the unlock information (8) is authenticated, the user account (3-7) will be unlocked for a predefined time, otherwise, the user account cannot be unlocked, the secure payment is therefore achieved by adding an unlock procedure which can be controlled by user.

31 Claims, 8 Drawing Sheets

BANKING COMPUTER ACCOUNT SYSTEM WITH LOCK FOR SECURE PAYMENT VIA TELEPHONE

CROSS-REFERENCE TO RELATED APPLICATION

This application is a continuation-in-part of co-pending International Application No. PCT/CN2004/000080, filed Jan. 20, 2004, which designated the United States and was not published in English, and is incorporated herein by reference in its entirety.

FIELD OF THE INVENTION

The present invention relates to computer and communication fields, in particular, to a financial computer system with transactions controlled via telephone signal and a corresponding method.

BACKGROUND ART

Secure payment has always been a topic that is continuously studied and improved in financial, computer, communication and manufacturing area. Single password input manner is not secure enough though it is adopted in financial transactions such as telephone bank and credit card service etc. Credit card fraud, debit card fraud, password being stolen happen from time to time. There is a need to further improve secure payment system and method.

SUMMARY OF THE INVENTION

The object of the present invention is to provide a more secure and reliable payment system and method compared to the prior art, which is suitable for automatic payment devices of all financial institutions at lower cost.

The object of the present invention is achieved in the following way:

A banking computer system with lock for secure payment via telephone, includes a telephone, a public communication system, a financial computer account system, wherein the financial computer account system usually locks its user accounts, debit and credit categories to be unlocked can be set, such account management services can be provided directly by an institution of deposit or intermediate, a private phone number is assigned to the user, and the unlock information associated with the user account can be set in the system. Once the user is connected to the financial computer account system using the private phone number through the public communication system, the financial computer account system will check whether or not the information for the private phone number matches the stored unlock information according to a predefined program, if matching, the user account will be unlocked for a predefined time, otherwise, the user account cannot be unlocked, the secure payment is therefore achieved.

Besides, a method for secure payment via telephone is provided, wherein the above-mentioned banking computer account system with lock is used.

Besides, a method for secure payment via telephone is provided, the method is suitable for bank, a credit card company, a financial institution providing prepaid card services and members'consumer services, It employs an existing financial computer account system in the financial institution, a public communication system and a telephone, wherein the unlock information associated with the account of specific the user is set in the financial computer account system, the financial computer account system assigns a private phone number to a user, the user can then unlock his account by dialing the assigned private phone number via the telephone, the financial computer account system will check whether or not the information set for the private phone number matches the stored unlock information set according to a predefined program, if matching, the user account will be unlocked, otherwise, the user account cannot be unlocked, and the user account will be locked after a predefined time since being unlocked.

An advantage of the present invention is that it improves the security performance of the system. Compared to the existing financial payment system, the security of the system is significantly improved. The user will no longer worry about that the money in his account will be stolen when no payment is being made, since his account can only be unlocked by his dial for specific information such as his own phone number or mobile phone number (i.e., the assigned phone number), and others cannot unlock the credit card by fraud. In addition, the system and method of the present invention can be implemented on the existing bank devices by adding a few devices at lower cost.

The system and method of the present invention will be described in greater detail below in conjunction with the drawings.

DETAILED DESCRIPTION OF THE INVENTION

The system and method of the present invention will be described in greater details below in conjunction with the drawings.

Figure 1:
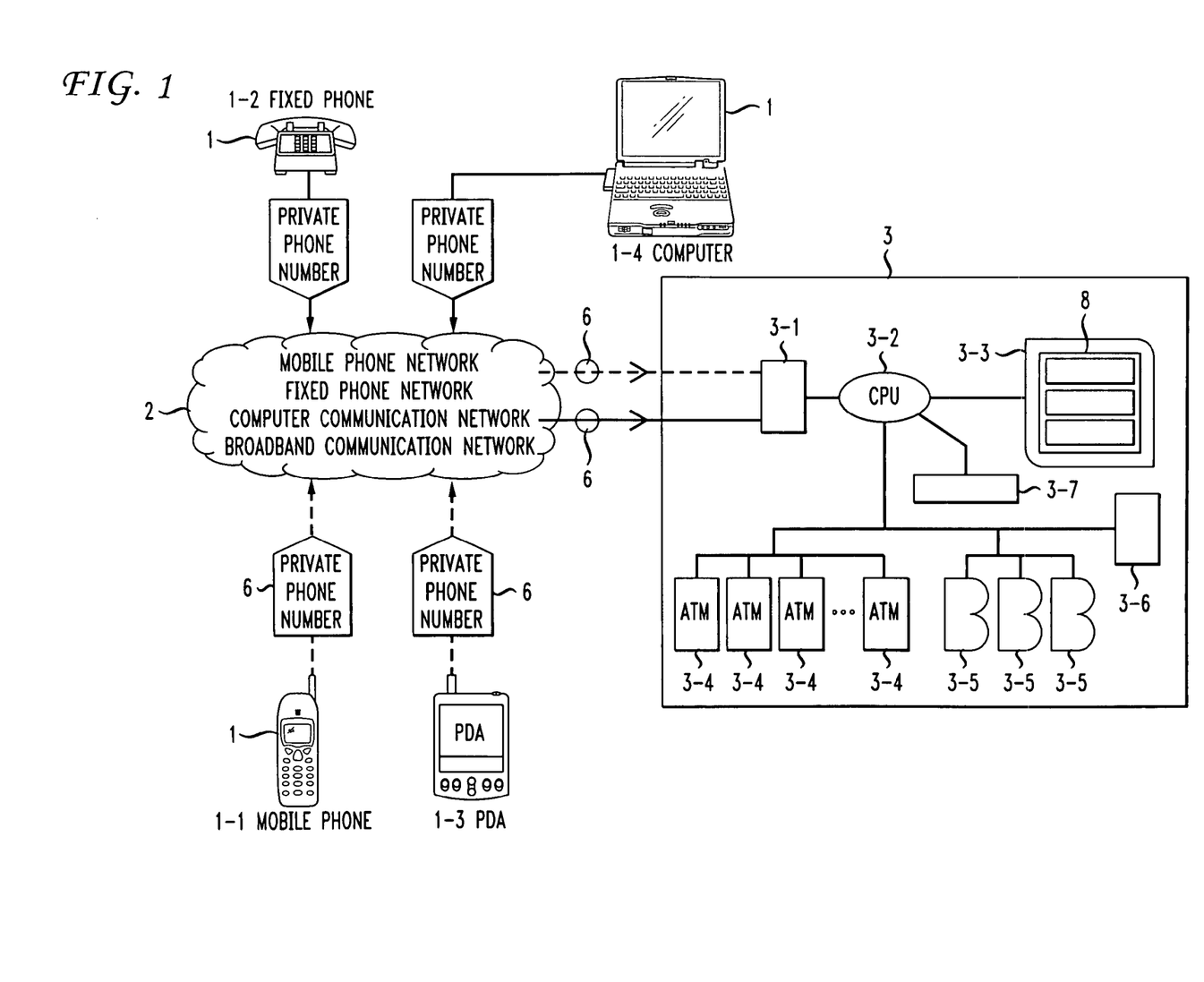
FIG. 1 is a schematic diagram illustrating a banking computer account system with lock for secure payment via telephone and corresponding method in accordance with the present invention.

With reference to FIG. 1, FIG. 1 is a schematic diagram illustrating a banking computer account system with lock for secure payment via telephone and corresponding method according to the present invention, wherein no Caller ID is used in the present embodiment.

The system and method of the present invention are mainly used by financial institutions such as banks, and their users. Some credit cards are issued by card companies instead of banks. These card companies also belong to the financial institutions described in the present invention, and they all use existing computer systems and devices, such as ATM (Automatic Teller Machine), credit card reader and corresponding computer system, and phone banking system, for payment. For example, the user draws money from the ATMs installed everywhere by banks using debit card, uses the phone banking services of banks, consumes in stores with credit card, and pays by debit card in stores etc. For example, a user draws 1000 RMB from his own account in the bank via ATM. After some operations of the ATM of the banking computer system, 1000 RMB is drawn to the user and the transaction is recorded on the user account.

The system of the present invention mainly includes a telephone 1, a public communication system 2 and a financial computer account system 3.

The system and method of the present invention are mainly wherein, as described above, user's account 3-7 in the financial account system 3 is usually "locked" so that operations such as drawing and transfer are not available. Certain operations must be performed between the user and the financial institution using predefined information. Users must operate in the system according to such procedures to "unlock" the account 3-7, then continue the operations such as drawing money using debit card, transfer via phone bank and pay by credit card. After a predetermined time since being unlocked, the user account will be "locked" to eliminate the chance and possibility of fraud. That is, in the system and corresponding method of the present invention, all user accounts (including a bank card, a credit card, various accounts) are usually in a lock state with no transaction available. The users must unlock his account before transactions (drawing, paying by card, transfer etc.) can be performed. Each unlock operation only unlocks the account for a time period which can be preset from several minutes to tens of minutes. The user can perform payment operations only in the unlock period. After the transaction is done or the unlock period expires, the user account will return to a lock state automatically, so as to ensure the safety of the user's money in this financial computer account system 3.

The phone 1 in the present invention can be a mobile phone 1-1, a fixed phone 1-2, a PDA 1-3 or a computer 1-4 which is used for unlock operations.

The banking computer system shown in FIG. 1 is wherein the financial computer account system 3 includes an auto-phone device 3-1, a CPU 3-2, a memory 3-3, a ATM 3-4, and/or a credit card reader 3-5, and/or phone transfer unit 3-6, user account 3-7, wherein the auto-phone device 3-1 receives the information sent by the public communication system 2 and forwards it to the central processor CPU 3-2, the memory 3-3 stores unlock information 8, the CPU 3-2 is connected to other units to control them according to a predefined program and check whether or not the received private phone number 6 matches the stored unlock information 8 for authentication purpose, if matching, the user account 3-7 is unlocked for a predefined time according to the predefined program, if not, the user account 3-7 will not be unlocked. Such structure in the financial computer account system 3 is applicable to all embodiments herein.

The present embodiment does not use a Caller ID, only one private phone number 6 is used. In the present embodiment, the confidential phone number referred to as the private phone number 6 are assigned to user by the financial computer account system 3 or the user may apply for it to the financial computer account system 3 (for example, a bank) where his account belongs to. The private phone number 6 is arranged by the financial computer account system 3 to associate with user account 3-7. This number is assigned to the user by the banking computer system, only the user himself and the banking computer system know which user account associates with this phone number, others including bank staffs won't know that number. In the present embodiment, the private phone number 6 is stored in the memory 3-3 as unlock information 8. To perform any payment transaction, the user uses any phone 1 to dial the private phone number 6 through the public system 2 to the financial computer account system 3, and hangs up immediately after it is connected. After the financial computer account system 3 (for example, a bank) receives the incoming call, its auto-phone device 3-1 sends information to the CPU 3-2, the CPU 3-2 searches the unlock information 8 of its memory 3-3 for corresponding unlock information 8 to find out the corresponding user account 3-7, then unlocks the user account for a time period so that the ATM 3-4, the credit card reader 3-5, and the phone transfer unit 3-6 etc. unlock the user account and the user may operate for a predefined time after which the user account will be locked again by the bank. The user may perform transactions such as drawing, paying by card and transferring during the unlock time period. No caller number needs to be checked in this method, the user may use any fixed phone, mobile phone or other phone, or even ask his parent to dial the confidential phone number for him.

The banking computer account system with lock and corresponding method shown in FIG. 1 are wherein, the public communication system 2 includes a mobile phone system, and/or a fixed phone system, and/or a network communication system, and the financial computer account system 3 includes a banking computer system 333, a credit card computer system 334 and a debt card company, a member card company, an investment company, a securities company etc. Such feature is suitable all embodiments of the present invention. Though only one financial computer account system 3 is outlined in the drawing, the system and method of the present invention are suitable for a number of independent or related financial computer account system 3, for example, respective independent banks, independent credit card companies, debt card companies, member card companies etc. In the embodiment shown in FIG. 1, the phone number sent by users is the private phone number 6, the phone number stored in unlock information 8 is also the private phone number 6, they are the same, which is the feature of the present embodiment and the present invention.

The method and system of the present invention may also be referred to as an anti-fraud method and corresponding system in which an account holder must electronically activate his account in a financial institution (e.g. a bank) so as to be able to perform certain income and expense transactions. The method is suitable for any bank account, credit card account, prepaid or periodical billing card accounts etc. As for account transfer within the financial institution (e.g. a bank etc.,), the user and bank may promise singly or mutually, for example, not using the system with lock of the present invention for bank interior transfer, but using the system with lock of the present invention for payment from outside.

For sure, the method and system of the present invention can be applied all the time.

Figure 2:
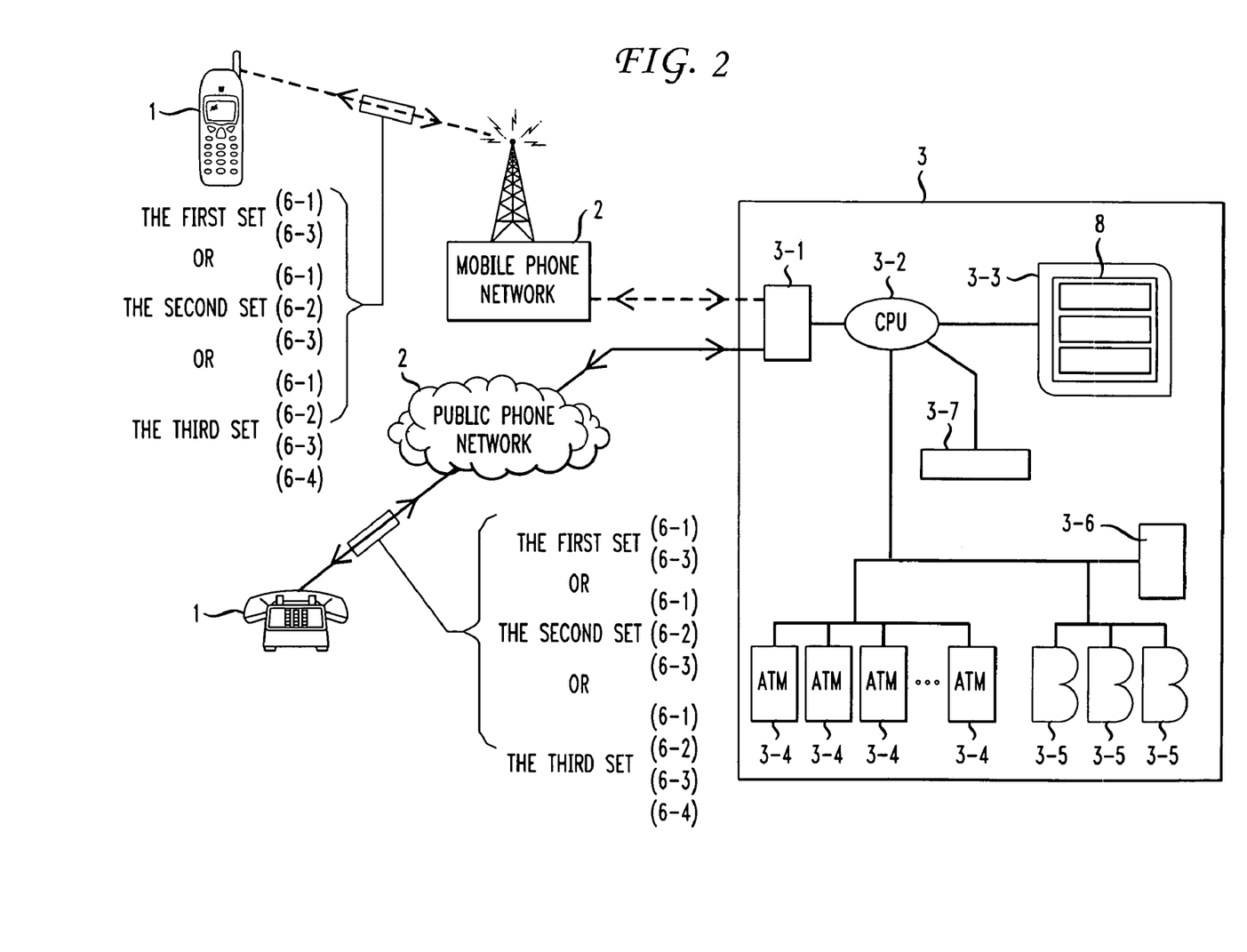
FIG. 2 is a schematic diagram illustrating an embodiment of the method and system in accordance with the present invention, wherein a Caller ID is used.

With reference to FIG. 2, it is the second embodiment of the system and corresponding method according to the present invention, wherein a Caller ID is used. The present embodiment is wherein the system is the same as that in the embodiment of FIG. 1, except further including a Caller ID and even information such as password etc. That is, the private phone number 6 in the embodiment of FIG. 1 is replaced with a information set used by users, for example, a specified phone number 6-1, a public phone number 6-2, a password 6-3 and an upper expense limit 6-4, the information set is stored accordingly. When users uses the specified phone number 6-1, the financial computer account system 3 can easily identify the specified phone number 6-1 as one of information set using Caller ID.

There are three different modes in the present embodiment, that is, the user and the financial computer account system 3 may promise one of the following three modes as the "unlock" information set.

The first information set: users use a specified phone number 6-1 and a public phone number 6-2 assigned by the financial computer account system 3, as a unlock information set 8 stored in the memory 3-3.

The second information set: the user uses the specified phone number 6-1, the public phone number 6-2 assigned by the financial computer account system 3 and a password 6-3, as the unlock information set (8) stored in the memory (3-3).

The third information set: the user uses the specified phone number 6-1, the public phone number 6-2 assigned by the financial computer account system 3, the password 6-3 and an upper expense limit 6-4, as the unlock information set 8 stored in the memory 3-3. Wherein the upper expense limit 6-4 has a format specified by the system, its amount is input by the user and its implement is controlled by the CPU 3-2. The format of this upper expense limit 6-4 remains the same in the following embodiments.

The CPU 3-2 of the financial computer account system 3 checks whether or not the information set from the user matches the unlock information stored in the memory 3-3, if matching (i.e., only when consistent completely), the CPU 3-2 unlocks the user account 3-7 to enable the user to perform transactions under his account. Since the Caller ID is available only in certain areas, the present embodiment only applies to certain areas. For other countries and outlying areas, the method of the following embodiments can be used.

In the present embodiment, it still uses a bank as an example of the financial computer account system 3. The user should first register his mobile phone number or fixed phone number as the specified phone number 6-1 at the financial computer account system 3 (e.g. a bank) so that the banking computer system can identify the user from the Caller ID. The bank should apply to a phone company for a number of public phone numbers 6-2. The bank assigns a public phone number 6-2 to the user, this public number 6-2 would be simultaneously assigned to users from hundreds to tens of thousands with no risk. This is the case of the first information set. The user may also choose the case of the second or the third information set, i.e., further encrypting the password 6-3 and associating the unlock information 8 stored in the memory 3-3 with the user account 3-7. Before any transaction can be performed, if the user chooses the first information set, he must uses the mobile phone with the specified phone number 6-1 to dial the public phone number 6-2, if the user chooses the second information unlock set, he must further input the password 6-3 and then hangs up, wherein the password 6-3 can be, for example, the number of 1 to 8 digits, if the user chooses the third information unlock set, he must further input the upper expense limit 6-4 and then hangs up. The unlock information is sent to the financial computer account system 3 over the public communication system 2. The CPU 3-2 of the bank finds out the corresponding user account 3-7 from the public phone number 6-2 dialed by the user and the received Caller ID of the specified phone number 6-1 using the unlock information 8, then unlocks the user account for a time period. After the time period, the bank locks the user account again. The user may perform transactions such as drawing, paying by car and transferring during a unlock state. It is not necessary to keep the unlock phone number secret with this method, the bank finds out the account number using the incoming call number and the unlock information 8 from the CPU. If a thief steals the user's mobile phone and card, the thief must try to dial various phone unlock number since there are thousands of different unlock phone numbers in the bank, and the banking computer account system will lock the user account after certain times of wrong dialing. In order to ensure the safety of user's money, user must go to the bank himself to unlock his account.

Figure 3:
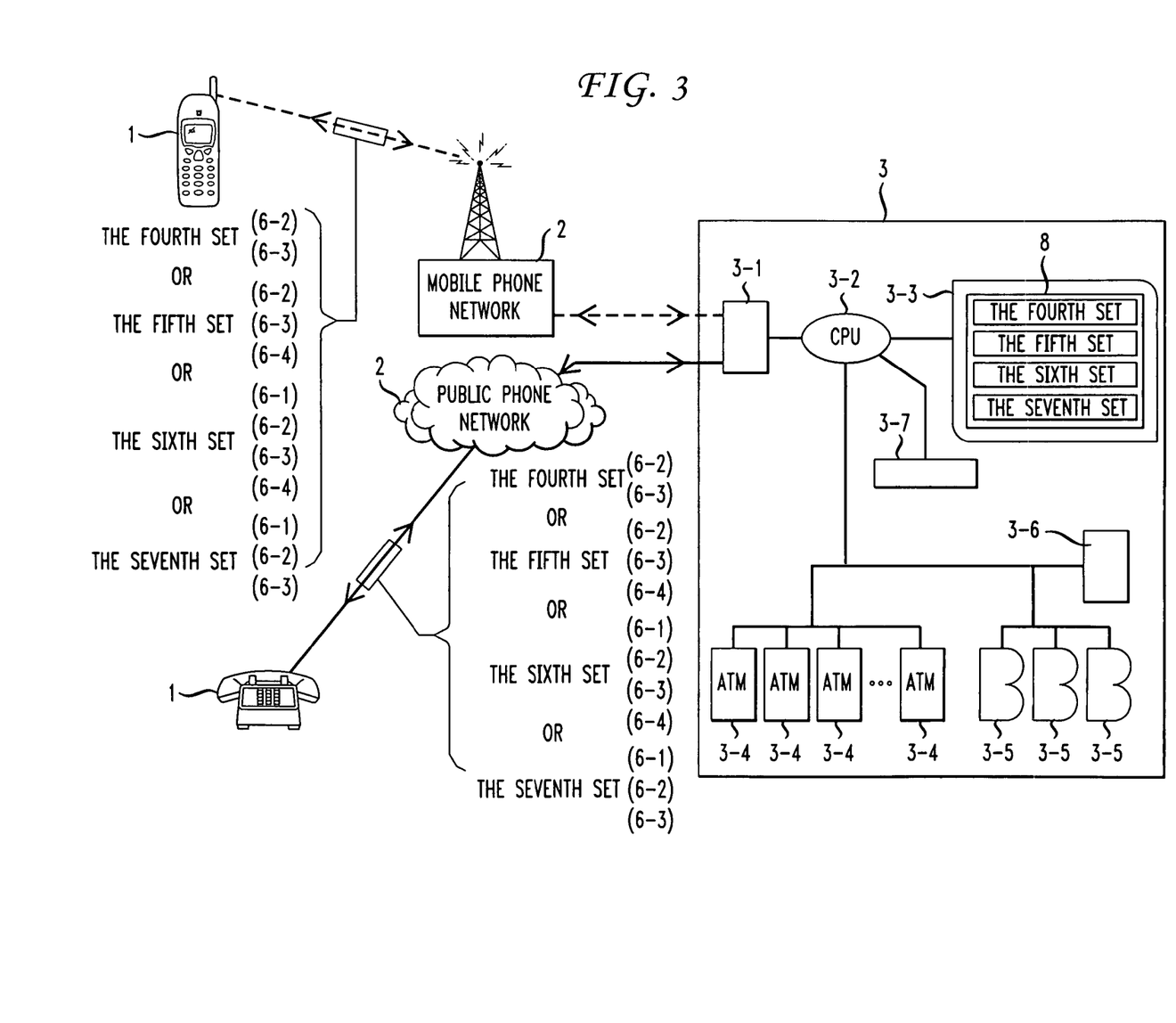
FIG. 3 is a schematic diagram illustrating an embodiment of the method and system in accordance with the present invention, wherein no Caller ID is used.

With reference to FIG. 3, it is the third embodiment of the system and method according to the present invention, wherein a Caller ID is not used.

The present embodiment is the same as the previous embodiment except that the private phone number 6 in FIG. 1 is replaced with several information sets. The system in the present embodiment is the same as that in FIG. 1. The present embodiment can be considered as a special example of the second embodiment, that is, the financial computer account system 3 provides the following four information sets for user's choice.

The fourth information set: a user uses a public phone number 6-2 and a password 6-3 as the unlock information set 8 stored in the memory 3-3.

The fifth information set: the user uses the public phone number 6-2, the password 6-3 and an upper expense limit 6-4 as the unlock information set 8 stored in the memory 3-3.

The sixth information set: the user uses the public phone number 6-2, a password 6-3, the upper expense limit 6-4 and a specified phone number 6-1 (e.g., the number of the mobile phone carried by the user) as the unlock information set 8 stored in the memory 3-3.

The seventh information set: the user uses the public phone number 6-2, the password 6-3, and the specified phone number 6-1 (e.g., the number of the mobile phone carried by the user) as the unlock information set 8 stored in the memory 3-3. The user may choose one of the unlock information sets as a unlock mode. The use mode is the same as that in the previous embodiment. If a user is in an area without the Caller ID (for example, dialing IDD oversea), one of the modes promised can be used, wherein the user may dial the public phone number 6-2. Since no Caller ID available, after the call is connected, the user should input other information in the information set, such as the password 6-3, the specified phone number 6-1 and the upper expense limit 6-4. The password 6-3 is preset by the user himself for use the areas without the Caller ID, and only the user himself knows the password. Upon receiving the predefined information set input by the user, the financial computer account system 3 (e.g. a bank) will check whether or not it matches the unlock information 8, if matching, the financial computer account system 3 unlocks the user account 3-7 for a predefined time and then locks it again.

Figure 4:
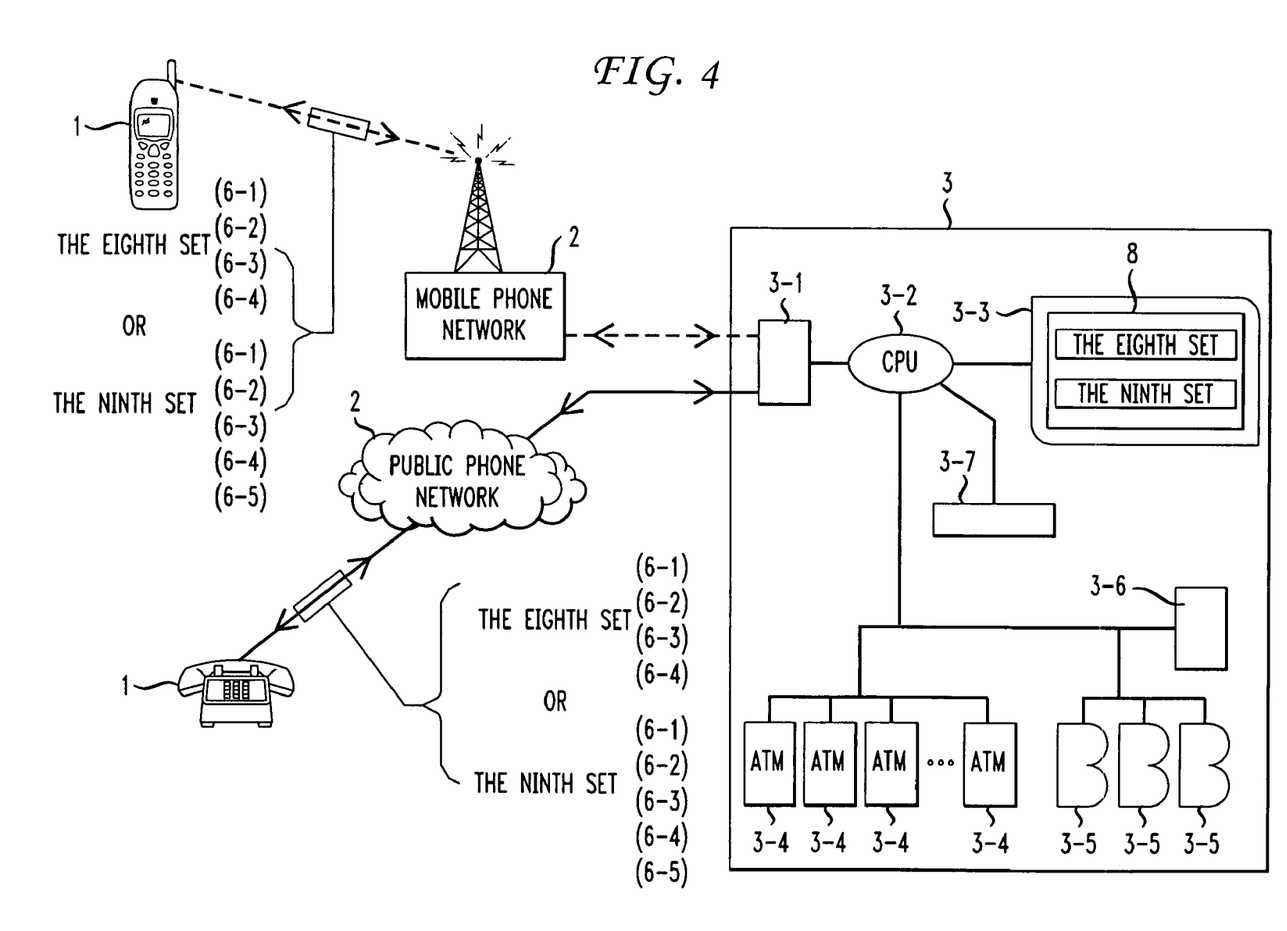
FIG. 4 is a schematic diagram illustrating an embodiment of the method and system in accordance with the present invention, wherein check account management and auto-transfer in a Caller ID manner are used.

With reference to FIG. 4, it is the fourth embodiment of the system and method according to the present invention. The present system is the same as that in FIG. 1, which is suitable for check account and auto-transfer.

Like the previous embodiment, the private phone number 6 in FIG. 1 is replaced with several information sets for user's choice and for the financial computer account system 3 to check. The present embodiment also uses a bank as an example, provides the following two information sets for user's choice, and also uses a Caller ID, as an unlock mode.

The eighth information set: the user uses a specified phone number 6-1, a public phone number 6-2, a password 6-3 and an upper expense limit 6-4 as the unlock information set 8 stored in the memory 3-3.

The ninth information set: the user uses the specified phone number 6-1, the public phone number 6-2, the password 6-3, the upper expense limit 6-4 and an unlock date/time 6-5 as the unlock information set 8 stored in the memory 3-3. The unlock date/time 6-5 for the user is variable and has a format set by the system and implemented by the CPU 3-2 according to the predefined program.

The mode of the present embodiment is the same as that of the previous embodiment. When a user uses the eighth unlock mode, the bank will first send a short message to inform the user about check and auto-transfer data, ask the user to unlock the corresponding account via the phone using the promised mode. The bank checks the Caller ID and password against the unlock information 8 to find out the corresponding account number.

The present method is suitable for checking account and auto-transferring etc. The user should first register his specified phone number 6-1 (e.g. his own mobile phone number) at the bank. The bank will have many different public phone numbers 6-2 for unlock and assign one to the user. This public phone number can be shared by tens of thousands users. Although tens of thousands users share one public phone number, it is very safe since a password 6-3 of up to 8 digits is input after the public phone number. When any transaction (such as cashing a check, auto-transferring etc.) is performed on the user account, the banking computer account system will send a short message to inform the user about it and ask the user to unlock the corresponding account. If the user agrees to pay, he should dial the public phone number using the mobile phone with the specified phone number 6-1 as follows: after the user dials the public phone number 6-2 and the system is connected automatically, the user inputs the unlock password 6-3 and the upper expense limit 6-4; the bank finds out the corresponding user account 3-7 using the CPU 3-2 to check whether or not the specified phone number 6-1 and the unlock password input by user match the unlocks information 8, if matching, the corresponding user account 3-7 will be unlocked, and the bank then perform the required transactions not exceeding the upper expense limit, such as cashing a check, auto-transferring etc. After the transactions are done, the bank will lock the user account 3-7 again.

When the ninth information set is used, the case is similar with that under the eighth information set. After a check is written or before the auto-transfer will be due, The user should use the mobile phone with specified phone number 6-1 to dial the public phone number 6-2 to unlock the corresponding account. The bank checks the information such as the Caller ID and password against the unlock information 8 using the CPU 3-2 to find the corresponding account number. After the account unlock password 6-3, upper expense limit 6-4 and unlock date/time 6-5 are received and authenticated, the bank will perform the transaction such as cashing a check or auto-transferring within the upper expense limit.

The present method is suitable for the following case: the user himself makes a call to unlock the corresponding account after the user writes a check or before an auto-transfer is due. The user should first register his specified phone number at the bank. The bank will have many different public phone numbers 6-2 for unlock and assigns one to the user. Although tens of thousands users share one public phone number, it is very safe since the password 6-3 of up to 8 digits is input after the public phone number. If there is any payment on the user account (for example, a check written by the user is cashed or an auto-transfer is due etc.), the user should dial the public phone number 6-2 using the mobile phone with the specified phone number 6-1, and then input the unlock password 6-3, the upper expense limit 6-4 and unlock date/time 6-5 when the system is automatically connected. The bank will find out the corresponding user account from the unlock information 8 stored in the memory 3-3 by using the CPU 3-2 to check the phone number dialed by the user and the unlock password 8 input by the user against the unlock information 8, and then unlock the corresponding user account for the unlock time input by the user. The bank will perform any payment on the user account (e.g. cashing a check, auto-transfer etc.) with the cumulated amount not exceeding the upper expense limit within the unlock date/time. After the payment, the bank will lock the user account again. It is not necessary to keep the unlock phone number secret in this method. The unlock date/time can be up to 24 hours and is set by the user on his own mobile phone.

Figure 5:
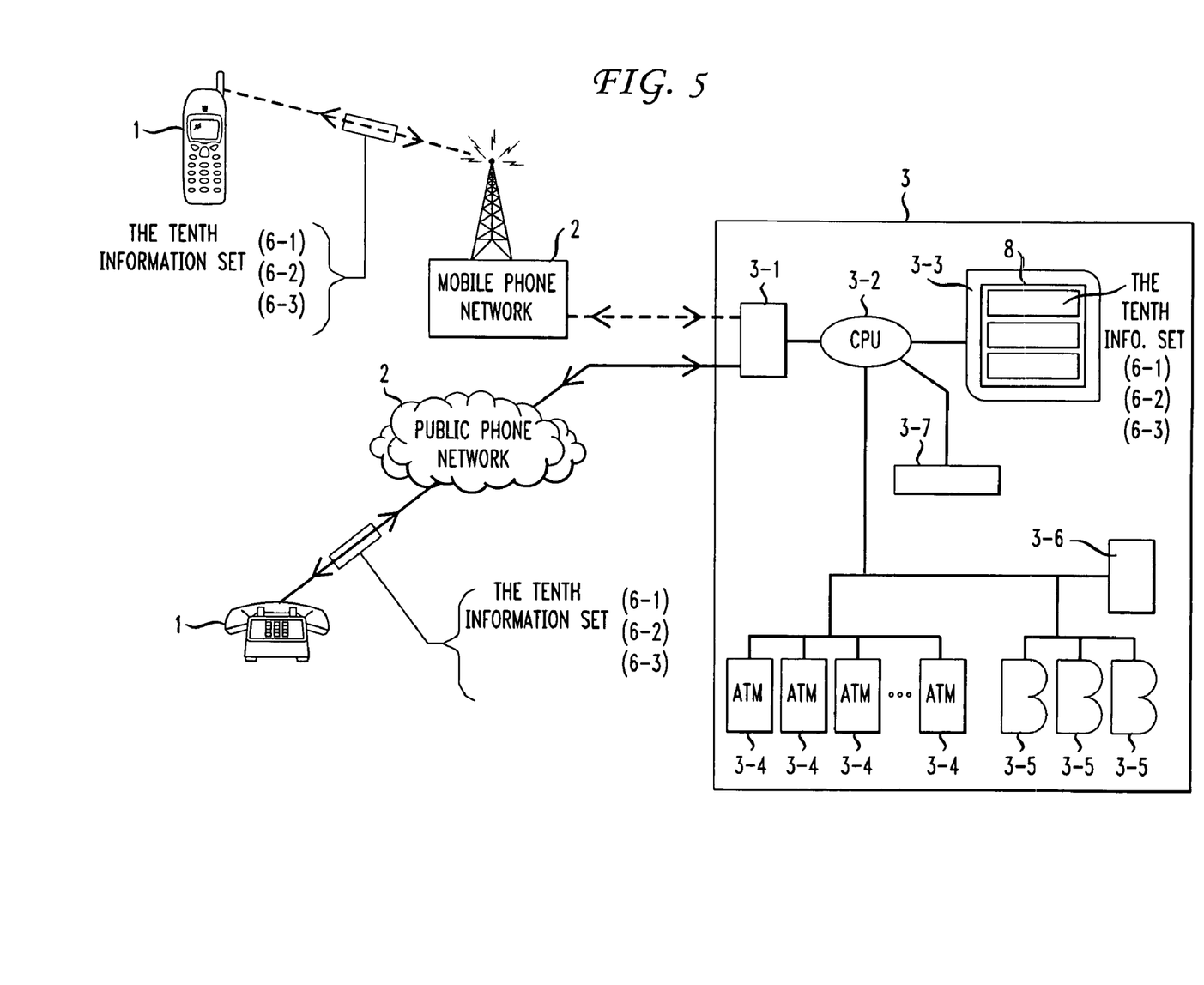
FIG. 5 is a schematic diagram illustrating an embodiment of the method and system in accordance with the present invention, wherein a phone short message service is used.

With reference to FIG. 5, it illustrates an embodiment of the method and system of the present invention, wherein a short message is used, the present system is the same as that in FIG. 1.

In the present embodiment, the private phone number 6 in FIG. 1 is also replaced with the unlock information set 8 including the short message which is provided by the financial computer account system 3.

That is, the tenth information set includes a specified phone number 6-1 (for example, user's own mobile phone number etc.), a public phone number 6-2 for receiving the short message, and an unlock password 6-3 which can be the number of 1-8 digits, as the unlock information set 8 stored in the memory 3-3.

The operating mode of the system is the same as that in the previous embodiments. That is, when the user uses the tenth information set as the unlock information set, the user should first register the (specified) phone number 6-1 at the bank. The bank will have many different public phone numbers for unlock and assign a public phone numbers 6-2 for receiving short messages to the user. The public phone number can be shared by tens of thousands users. Although tens of thousands users share one public phone number, it is very safe since the unlock password 6-3 of up to 8 digits should be added into the short message. Before any transaction can be made, the user must use the phone with the specified phone number 1 to send the unlock password 6-3 to the public phone number 6-2 for unlock via short message. After receiving the short message, the bank will check whether or not it match the unlock information 8 so as to find out a corresponding user account number 3-7, if matching, the bank will unlock the user account for a time period during which the user may perform transactions such as drawing, paying by card and transferring etc., and then lock the user account again after the unlock time period.

Figure 6:
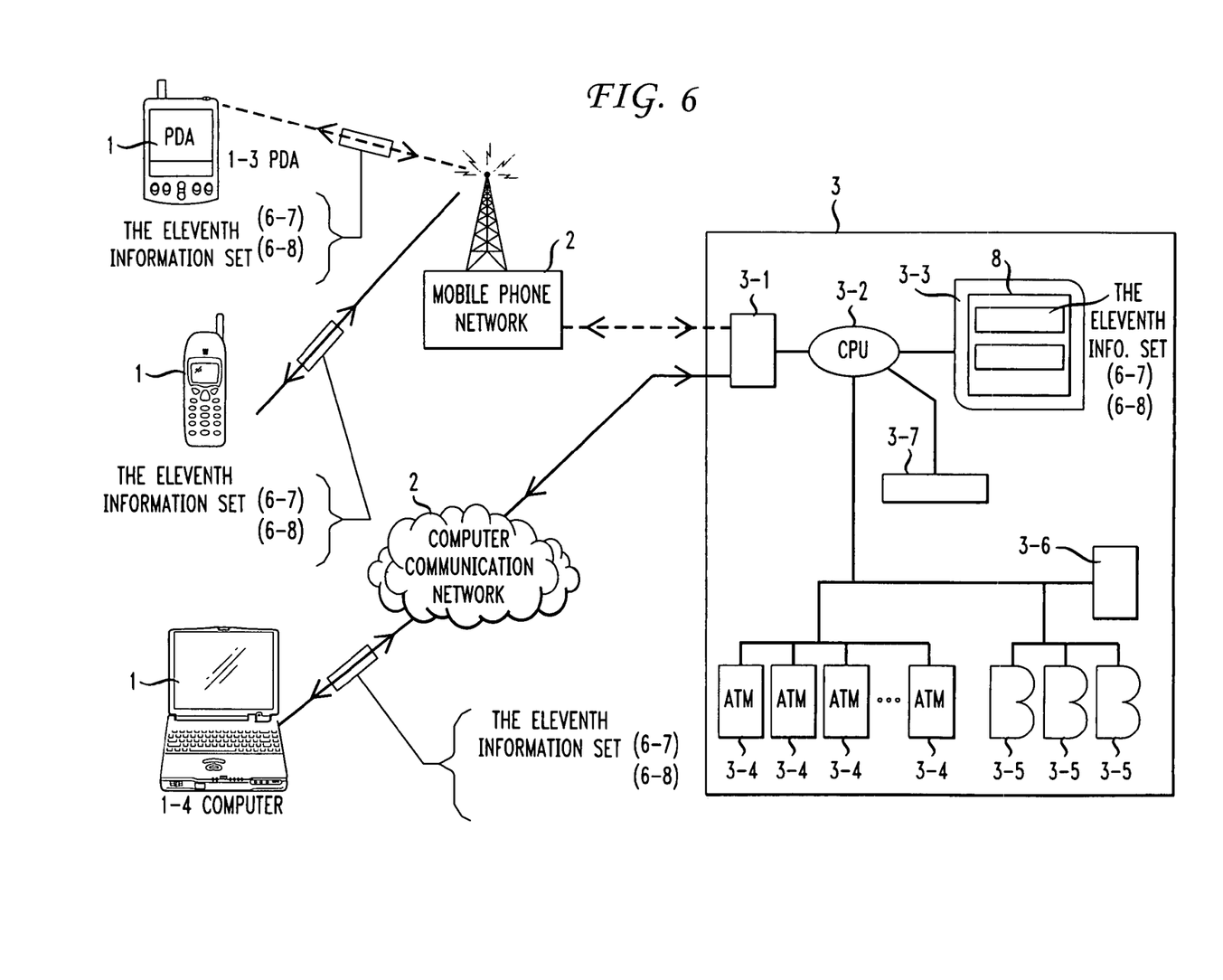
FIG. 6 is a schematic diagram illustrating an embodiment of the method and system in accordance with the present invention, wherein a email is used.

With reference to FIG. 6, it is an embodiment with emails. Like previous embodiments, the system shown in FIG. 1 is used. The private phone number 6 is replaced with email information set as the unlock information 8 to be assigned to users by the system.

That is, the eleventh set includes an email address 6-7 and an unlock password 6-8 of up to 8 digits included in the mail, as the unlock information set 8 stored in the memory 3-3 for comparison and check performed by the CPU 3-2.

As described above, it still uses a bank as an example (the financial computer account system 3). The bank will give a user an email address 6-7 for receiving the unlock information. The mail address can be shared by tens of thousands users. Although tens of thousands users share one mail address, it is very safe since the unlock password 6-8 of up to 8 digits should be added into the email. Before any transaction can be made, the user must use an email to send the unlock password to the email address for unlock. After receiving the mail and checking the unlock password, the bank will find out the corresponding user account number from the unlock information 8, and unlock the user account for a time period during which the user may perform transactions such as drawing, paying by card and transferring etc., and the bank will lock the user account again after the unlock time period.

Figure 7:
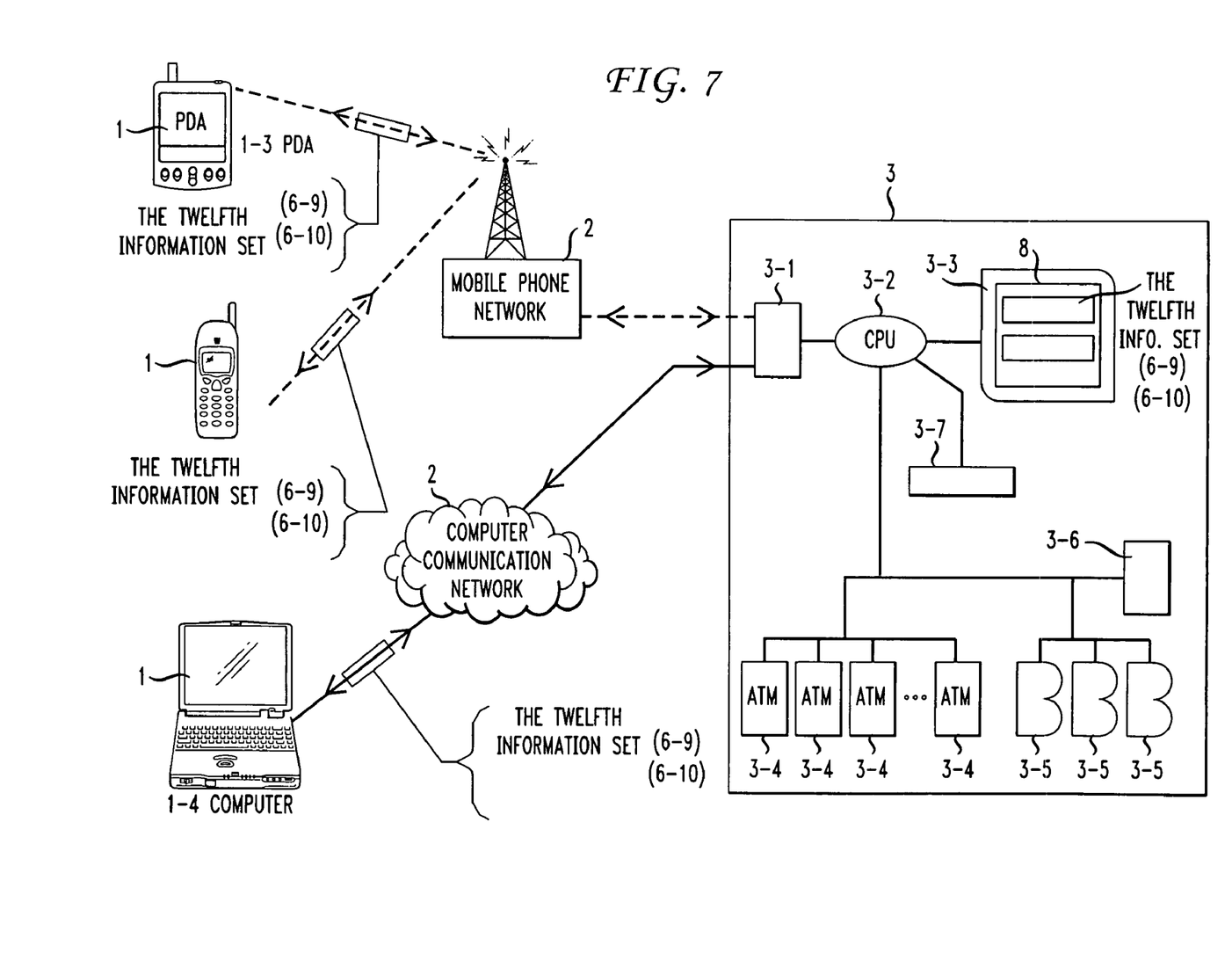
FIG. 7 is a schematic diagram illustrating an embodiment of the method and system in accordance with the present invention, wherein a network communication is used.

With reference to FIG. 7, it illustrates the embodiment of utilizing network communication. The system in this embodiment is the same as that in previous embodiments, wherein the private phone number 6 in FIG. 1 is replaced with the network communication manner.

The twelfth unlock information set includes a network address 6-9 and an unlock password 6-10, as the unlock information set 8 stored in the memory 3-3 for comparison and check performed by the CPU 3-2.

The present embodiment still uses a bank as an example. The bank will give a user a network address 6-9 for receiving the unlock password. The network address can be shared by tens of thousands users. Although tens of thousands users share one network address, it is very safe since the unlock password 6-10 of up to 8 digits should be input into the web site with the network address when accessing the website. Before any transaction can be made, the user must connect the network to access the bank with the network address 6-9, and input the unlock password 6-10. After receiving and authenticating the unlock password, the bank will find out the corresponding user account number 3-7 from the unlock information 8, and unlock the user account for a time period during which the user may perform transactions such as drawing, paying by card and transferring etc., and the bank then lock the user account again after the unlock time period.

The system and method of the present invention are described in greater detail in conjunction with the above embodiments.

Figure 8:
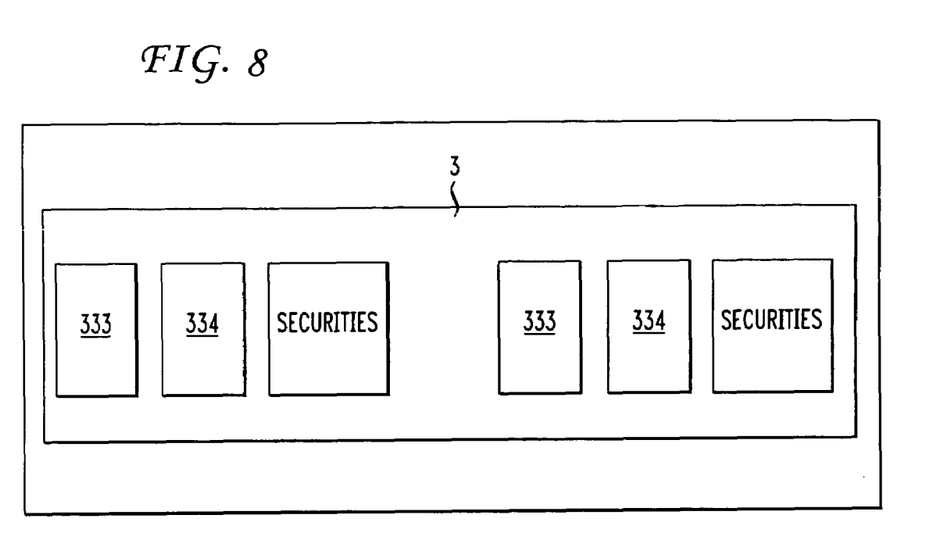
FIG. 8 is a schematic diagram illustrating the financial institutions included in the financial computer account system in the system and corresponding method in accordance with the present invention.

With reference to FIG. 8, it shows the financial computer account system 3, including various financial computerized institutions, especially including a banking computer system 333, a credit card computer system 334 and securities companies, investment companies, various card companies, member card companies etc.

The present invention can be implemented in many flexible manners. For example, any one of the following examples may be used for multi-drawing in small amount or single-drawing in large amount.

The user's all accounts (including a bankcard, a credit card and various accounts) are generally in the lock state in which no transaction can be made. Before any transaction (drawing, paying by card, transfer etc.), the user has to unlock his account. Two different manners for unlock may be used respectively for drawing in small amount and drawing in large amount.

1. Multi-Drawing

Multi-drawing is suitable for drawing in small amount for many times in an unlock period. The account can be kept unlocked for a relatively long period for every unlocking operation. The unlock period (T) and amount limit (M) can be preset by the user. The unlocked period (T) may range from days to months, or may be undefined. The amount limit (M) can be, for example, 3000 or 5000 Yuan. In the unlock state, the user is allowed to make transaction in small amount for many times. The drawing amount will be deducted from the preset amount limit (M) in every transaction. When the balance is less than the amount to be drawn, the bank will automatically lock the user account and cancel the current transaction. Drawing or transaction in small amount is available provided that the user unlocks his account again.

2. Single-Drawing or Single-Transaction

Single-drawing is suitable for drawing or transaction in large amount once in an unlock period. The account can be kept unlocked for a period for every unlocking operation. The unlock period can be preset by the user, ranging from several minutes to decades of minutes. During the unlock period, the user is allowed to make transaction or draw once. After that, the account will be locked automatically.

The user has to register his mobile phone number in the bank first. There are a plurality of different public phone numbers for unlock in the bank. The bank assigns one (or two) of these public phone numbers to the user. These public phone numbers can be shared by tens of thousands users. Although tens of thousands users share one public phone number, it is very safe since an unlock password of up to 8 digits is input after the public phone number. Before any transaction is made, the user has to dial the public phone number with his mobile phone as follows:

Method 1

Multi-transaction in small amount: after the user dials the public phone number and the system then connects automatically, the users should input the unlock password. The bank will locate the corresponding user account with the help of the Caller ID. Upon ensuring the correct unlock password, the user account is unlocked. In the unlock state, the user is allowed to make transaction in the amount less than the preset amount limit (M) for many times. The current drawing amount is deducted from the preset amount limit (M) in every transaction. When the balance is less than the amount to be drawn, the bank will automatically lock the user account, cancel the current transaction, and send the accumulative amount of the transactions to the user by SMS.

Method 2

Single-transaction in large amount with a need to input an upper payment limit: after the user dials the public phone number and the system then connects automatically, the user inputs the unlock password and the upper payment limit. The bank will, with the help of the Caller ID, then locate the corresponding user account and unlock it for a period after ensuring the correct unlock password. During the period mentioned above, the user is allowed to make single-drawing or single-transaction in the amount less than the upper payment limit. After the transaction, the bank will lock the account and send the current transaction details to the user by SMS.

Method 3

Single-transaction in large amount with no need to input an upper payment limit: after the user dials the public phone number and the system then connects automatically, the user inputs the unlock password. The bank will, with the help of the Caller ID, then locate the corresponding user account and unlock it for a period after ensuring the correct unlock password. During the period mentioned above, the user is allowed to make single-transaction (no limit is set to the amount of transaction provided that the amount is within the credit loan amount provided by the bank). After the transaction, the bank will lock the account and send the current transaction details to the user by SMS.

With the combination of Method 1 and Method 2, the bank will only need to assign one unlock phone number to the user. If the user dials the number and input the unlock password without inputting the upper payment limit, the multi-transaction in small amount can be made for many times in every unlock period; if the user additionally add the step of inputting the upper payment limit, the multi-transaction in large amount can be made.

With the cooperation of Method 1 and Method 3, the bank has to assign two telephone numbers to the user for unlock, wherein one of the two telephone numbers is used as the unlock telephone number for the transaction in small amount (TL1), particularly for the unlock operation of multi-transaction in small amount, and another is used as the unlock telephone number for the transaction in large amount (TL2), particularly for the unlock operation of single-transaction in large amount.

Summarily, the aforementioned examples are characterized in that, the predefined time (T) for keeping the user account (3-7) unlocked can be associated with an amount limit (M) preset by the user. When the accumulative amount for the user to draw once or more times is more than the amount limit (M), the user account (3-7) can remain unlocked. When the accumulative amount for the user to draw once or more times is less than the amount limit (M), the user account will be locked automatically and the current transaction will be cancelled. The user has to unlock his account if he wants to draw again. The present method is particularly suitable for multi-transaction in small amount. For drawing in large amount preset by the user, (1) adding the step of inputting the upper expense limit preset by the user after the user dials the number and then inputs the password, or (2) assigning two telephone numbers to the user for unlock, i.e., one is used as the unlock telephone number for the transaction in small amount (TL1), particularly for the unlock operation of multi-transaction in small amount, and another is used as the unlock telephone number for the transaction in large amount (TL2), particularly for the unlock operation of single-transaction in large amount.

Another embodiment of the present invention is a burglar-proof and secure method and system of accounts provided by financial or non-financial institutions for their account holders. Such a burglarproof and secure method and system allows account holders to control the state of their accounts using wireless electronic communication devices. When accounts or certain account items of drawing or depositing are not activated by wireless electronic devices as agreed by account holders, all transactions, in particular the transactions reported via an electronic means, can not be added to their accounts, so that the burglar-proof object is achieved. In this embodiment, one more effective procedure for customer authentication is added to the existing customer authentication process. In this way, the account holders' money can be ensured safe even when their identity codes (cards or user codes) are all stolen. The greatest advantage of the method and system lies in that it is directly connected to the financial computer account system. Consequently, no matter how an electronic transaction is originated, such a method and system according to the embodiment of the present invention can be used as a burglarproof and secure measure, so long as the transaction is related to accounting.

The system, in which the aforementioned burglarproof and secure method is implemented according to the present invention, may be used to set the accounting state of an individual account and to accept electronic transactions. Furthermore, the system is connected to another system for processing the instructions to activate accounts sent by account holders using wireless communication devices. The system according to the present invention includes a financial computer account system (a) for setting the state of an individual account in a financial or non-financial institution. The financial computer account system (a) is similar to the financial computer account system 3 in the FIGS. 1-7 with exception that it has one or more receivers (b) built therein or externally connected thereto for receiving instructions to activate accounts. The financial computer account system (a) is connected to a subsystem (c) for processing electronic transactions. The subsystem (c) for processing electronic transactions includes an on-line or off-line transaction terminal (d). One customer database is established for recording codes of the wireless electronic devices (e), with which the account holders send instructions to activate accounts to the financial computer account system (a), and for recording individualized settings to activate accounts.

A financial computer account system (a) may be an account system of a bank or financial institution, a credit card company, a financial network operator, a prepaid card distributor, etc. A receiver for receiving instructions to activate accounts may be a voice processing system, such as the phone banking system of a bank; a data processing system, such as an on-line bank; or a mobile phone banking system for processing short message or multimedia message of a mobile phone; and/or an electronic receiver specially designed to activate accounts.

A subsystem (c) for processing electronic transaction may be a debit system via IC cards of an on-line bank, an ATM/CDM, a bank card, a phone bank or a prepaid card distributor.

Individualized settings include the conditions satisfied to activate accounts with either a registered or a non-registered wireless electronic device. For example, in the case of using a non-registered wireless electronic device to activate accounts, an additional identification code needs to be entered. Individualized settings may also include a time period to keep accounts activated. For example, no matter whether there are transactions to be processed, accounts would shift to a sleeping state automatically after remaining activated for 10 minutes and any request for accounting would no longer be accepted unless the accounts are reactivated. Individualized settings may also include an upper limit set for amount of every acceptable account or accumulated in a particular time after the accounts are activated. For sure, individualized settings may also include other settings considered necessary to enhance security by account holders.

Wireless electronic devices in this embodiment include a mobile phone, a PDA or the like. Instructions to activate accounts sent by the wireless electronic devices may transmit instructions in the form of voice, text and multimedia information to the relevant instruction receiver built in or externally connected to the account system. A time period to keep accounts activated may be preset, such as 10 minutes or half an hour, etc, and may be set by account holders whenever needed. Also, an upper limit for amount of every transaction or accumulated in a particular time may be set, such as US $10,000, US $100,000, etc.

Once account holders send instructions to activate accounts to a financial computer account system, by which the instructions are verified, using the wireless electronic devices registered in advance, the financial computer account system then accepts the request for accounting of transactions transmitted via an electronic means. In this way, it can be prevented that other people embezzling the account holders' electronic identification certificates steal the account holders' money via an electronic means.

While the invention has been described above with reference to preferred embodiments thereof, these embodiments are merely exemplary and not restrictive. Those skilled in the art will recognize that modifications of the invention can be made without departing from the spirit of the invention. These modifications have to fall within the scope of the invention, which is only limited by the appended claims.

I claim:

1. A banking computer account system for secure payment via telephone, the system comprising:
   a telephone (1) of a user, wherein said telephone is assigned a private telephone number (6);
   a public communication system (2),
   a financial computer account system (3) of a financial institution, said financial computer account system storing unlock information of said user in a memory (3-3), and wherein said user is connected to said financial computer account system using said telephone via said public communication system; and
   a user account of said financial computer account system belonging to said user, wherein said user account is normally in a locked state preventing withdrawal from said user account, wherein said financial computer account system is arranged to determine if said private telephone number of said telephone matches said stored unlock information, and wherein said financial computer account system is further arranged to unlock said user account allowing withdrawals for a predefined time when it is determined there is said match, whereby secure payment is achieved.

2. The system of claim 1, wherein the financial computer account system (3) includes an auto-phone device (3-1), and a CPU (3-2), wherein the CPU (3-2) is connected to said auto-phone device (3-1) and is arranged to receive said private telephone number from said auto-phone device in order to check whether or not the received private phone number (6) matches the stored unlock information (8) according to a predefined program.

3. The system of claim 1, wherein the unlock information (8) is:
   a first information set, including a specified phone number (6-1) and a public phone number (6-2) assigned by the financial computer account system (3); or
   a second information set, including the specified phone number (6-1), the public phone number (6-2) assigned by the financial computer account system (3), and a password (6-3); or
   a third information set, including the specified phone number (6-1), the public phone number (6-2) assigned by the financial computer account system (3), the password (6-3), and an upper expense limit (6-4) wherein the upper expense limit (6-4) has a format specified by the system, the amount of the upper expense limit (6-4) is input by the user and controlled by the CPU (3-2); or
   a fourth information set, including the public phone number (6-2) and the password (6-3); or
   a fifth information set, including the public phone number (6-2), the password (6-3), and the upper expense limit (6-4); or
   a sixth information set, including the public phone number (6-2), the password (6-3), the upper expense limit (6-4), and the specified phone number (6-1); or
   a seventh information set, including the public phone number (6-2), the password (6-3), and the specified phone number (6-1); or
   an eighth information set, including the specified phone number (6-1), the public phone number (6-2), the password (6-3), and the upper expense limit (6-4); or
   a ninth information set, including the specified phone number (6-1), the public phone number (6-2), the password (6-3), the upper expense limit (6-4), and an unlock date/time (6-5); or
   a tenth information set, including the specified phone number (6-1), the public phone number (6-2), a short message for unlock, and the password (6-3); or
   a eleventh information set, including an email address (6-7), and an unlock password (6-8) included in an e-mail message sent to the e-mail address; or
   a twelfth information set, including a network address (6-9) and an unlock password (6-10).

4. The system of claim 1, wherein the telephone (1) is a mobile phone, a fixed phone, a computer or a PDA.

5. The system of claim 1, wherein the public communication system (2) includes a mobile phone system, and a fixed phone system, and a network communication system, and wherein the financial computer account system (3) includes a banking computer system (333), a credit card computer system (334), a debt card computer system, or a financial securities computer system.

6. A method for secure payment via telephone, said method comprising:
   storing unlock information associated with a user financial account in a financial computer account system of a financial institution;
   locking said financial account of said user by said financial computer account system, said locking preventing withdrawals from said financial account;
   receiving, at said financial computer account system, a telephone call from a telephone of said user;
   identifying a private telephone number assigned to said telephone of said user;
   determining if said identified private telephone number matches said stored unlock information; and
   unlocking, by said financial computer account system, said financial account and allowing withdrawals for a predefined time when it is determined that said identified private telephone number matches said stored unlock information.

7. A method for secure payment via telephone using an existing financial computer account system (3) in an existing financial institution, a public communication system (2) and a telephone (1), said method comprising:
   storing unlock information set (8) associated with the account (3-7) of a specific user in the financial computer account system (3),
   assigning, by the financial computer account system (3), a private phone number (6) to the user, said private phone number being included in said unlock information set;
   dialing, by said specific user, from the assigned private phone number (6) of the telephone (1) the financial computer account system;
   checking, by the financial computer account system (3), whether or not an information set for the private phone number (6) matches the stored unlock information set (8);
   unlocking the user account if there is said match for a predefined time; and
   locking said user account after said predefined time has elapsed.

8. The method of claim 7, wherein the unlock information (8) is:
   a first information set, including a specified phone number (6-1) and a public phone number (6-2) assigned by the financial computer account system (3); or
   a second information set, including the specified phone number (6-1), the public phone number (6-2) assigned by the financial computer account system (3), and a password (6-3); or a third information set, including the specified phone number (6-1), the public phone number (6-2) assigned by the financial computer account system (3), the password (6-3), and an upper expense limit (6-4) wherein the upper expense limit (6-4) has a format specified by the system, the amount of the upper expense limit (6-4) is input by the user and controlled by the CPU (3-2); or a fourth information set, including the public phone number (6-2) and the password (6-3); or a fifth information set, including the public phone number (6-2), the password (6-3), and the upper expense limit (6-4); or a sixth information set, including the public phone number (6-2), the password (6-3), the upper expense limit (6-4), and the specified phone number (6-1); or a seventh information set, including the public phone number (6-2), the password (6-3), and the specified phone number (6-1); or an eighth information set, including the specified phone number (6-1), the public phone number (6-2), the password (6-3), and the upper expense limit (6-4); or a ninth information set, including the specified phone number (6-1), the public phone number (6-2), the password (6-3), the upper expense limit (6-4), and an unlock date/time (6-5); or a tenth information set, including the specified phone number (6-1), the public phone number (6-2), a short message for unlock, and the password (6-3); or a eleventh information set, including an email address (6-7), and an unlock password (6-8) included in an e-mail message sent to the e-mail address; or a twelfth information set, including a network address (6-9) and an unlock password (6-10).

9. The method of claim 7, wherein the predefined time (T) is associated with an amount limit (M) preset by the user, said method further comprising:

maintaining said user account as unlocked when a cumulative amount withdrawn by the user is less than the amount limit (M).

10. The method of claim 7, further comprising:

storing an upper expense limit for said user account in said financial computer account system;

inputting the upper expense limit by the user after the user dials the account system and then inputs a password; and allowing a withdrawal from said user account only if said withdrawal is less than said upper expense limit.

11. The method of claim 7, wherein the predefined time (T) is associated with an amount limit (M) preset by the user, said method further comprising:

locking automatically said user account when a cumulative amount withdrawn by the user is more than the amount limit (M); and cancelling a current transaction of said user.

12. The method of claim 7, further comprising:

assigning two telephone numbers to the user, wherein a first one is used as the unlock telephone number for a transaction in a small amount (TL1), and a second one is used as the unlock telephone number for a transaction in a large amount (TL2) that is greater than said small amount;

allowing withdrawals from said user account having values less than a predetermined number when said user inputs said first telephone number; and allowing withdrawals from said user account having values greater than said predetermined number when said user inputs said second telephone number.

13. A computer account system with security via an electronic means, the system includes:

a financial computer account system (a) having a plurality of accounts wherein the accounting state of an individual account may be sets;

one or more receivers (b) connected to said financial computer account system for receiving instructions to activate one of said accounts;

a subsystem (c) connected to the financial computer account system for processing electronic transactions, the subsystem for processing electronic transactions including on-line or off-line transaction terminals (d);

a wireless electronic device (e) arranged to send codes with which account holders send instructions to activate said accounts of the financial computer account system (a) via the electronic means; and a customer database recording said codes of the wireless electronic device (e).

14. The computer account system of claim 13, wherein said financial computer account system (a) is an account system of a bank, a financial institution, a credit card company, a financial network operator, or a prepaid card distributor.

15. The computer account system of claim 13, wherein said one or more receiver for receiving instructions to activate accounts includes a telephone voice processing system.

16. The computer account system of claim 13, wherein said one or more receiver for receiving instructions to activate accounts includes a data processing system.

17. The computer account system of claim 13, wherein said receiver for receiving instructions to activate accounts includes a mobile phone banking system for processing a short message or multimedia message of a mobile phone, or an electronic receiver specially designed to activate accounts.

18. The computer account system of claim 13, wherein said subsystem (c) for processing electronic transactions is an on-line bank.

19. The computer account system of claim 13, wherein said subsystem (c) for processing electronic transactions is a debit system implemented via IC cards of an ATM/CDM, a bank card, a phone bank or a prepaid card distributor.

20. The computer account system of claim 13, wherein said wireless electronic device (e) includes a mobile phone, a PDA or other wireless electronic devices with identification.

21. The computer account system of claim 13, wherein said customer database includes individualized settings having conditions satisfied to activate accounts with either a registered or a non-registered wireless electronic device.

22. The computer account system of claim 21, wherein said individualized settings also include a time period to keep accounts activated, and wherein said accounts shift automatically to a sleeping state after the time period expires no matter whether there are transactions to be processed and any request for accounting would no longer be accepted.

23. The computer account system of claim 22, wherein said time period to keep accounts activated is preset by account holders.

24. The computer account system of claim 22, wherein said time period to keep accounts activated is set by account holders when needed.

25. The computer account system of claim 21, wherein said individualized settings also include an upper limit set for a single withdrawal from an account or a cumulative upper limit on withdrawals accumulated in a particular time after the accounts are activated.

26. The computer account system of claim 21, wherein said individualized settings also include conditions considered necessary to enhance security by account holders.

27. The computer account system of claim 13, wherein said wireless electronic device being further arranged to send an additional identification code in the case of using a non-registered wireless electronic device to activate accounts.

28. The computer account system of claim 13, wherein said instructions to activate accounts are sent to a relevant instruction receiver connected to the financial computer account system.

29. The computer account system of claim 28, wherein said instructions to activate accounts include instructions in the form of voice, text, or multimedia.

30. The computer account system of claim 28, wherein a time period to keep accounts activated is set and an upper limit for the debit amount of every transaction or a cumulative limit on withdrawals accumulated in a particular time is also set.

31. The computer account system of claim 28, wherein said activation of accounts selects certain or all debit items.

* * * * *